Dec. 21, 1965 E. E. HOYT, JR 3,224,213
METHOD FOR MAKING AND HARVESTING ICE USING
ULTRASONIC VIBRATORS
Filed July 17, 1964 2 Sheets-Sheet 1
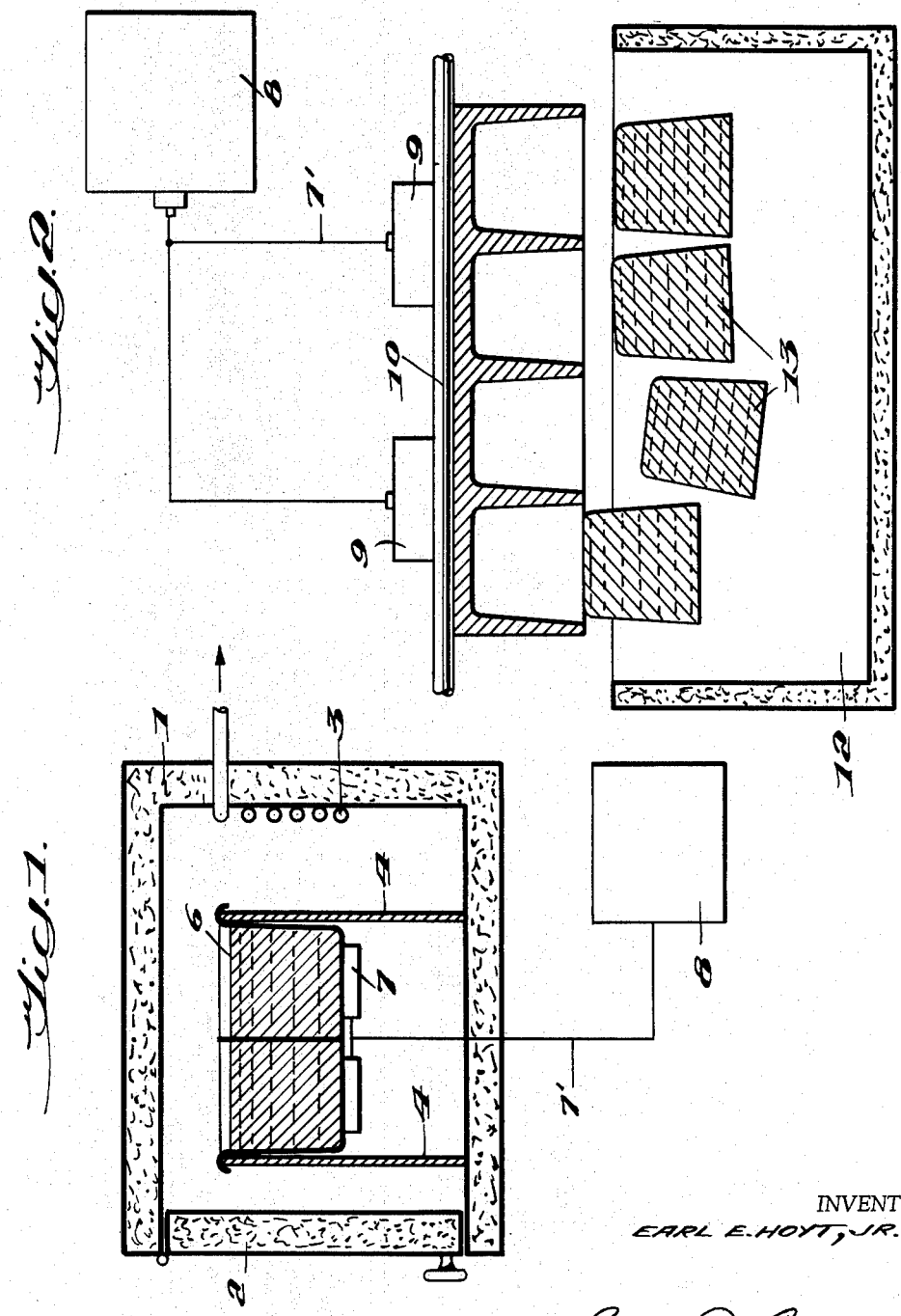
INVENTOR
EARL E. HOYT, JR.
BY
ATTORNEY

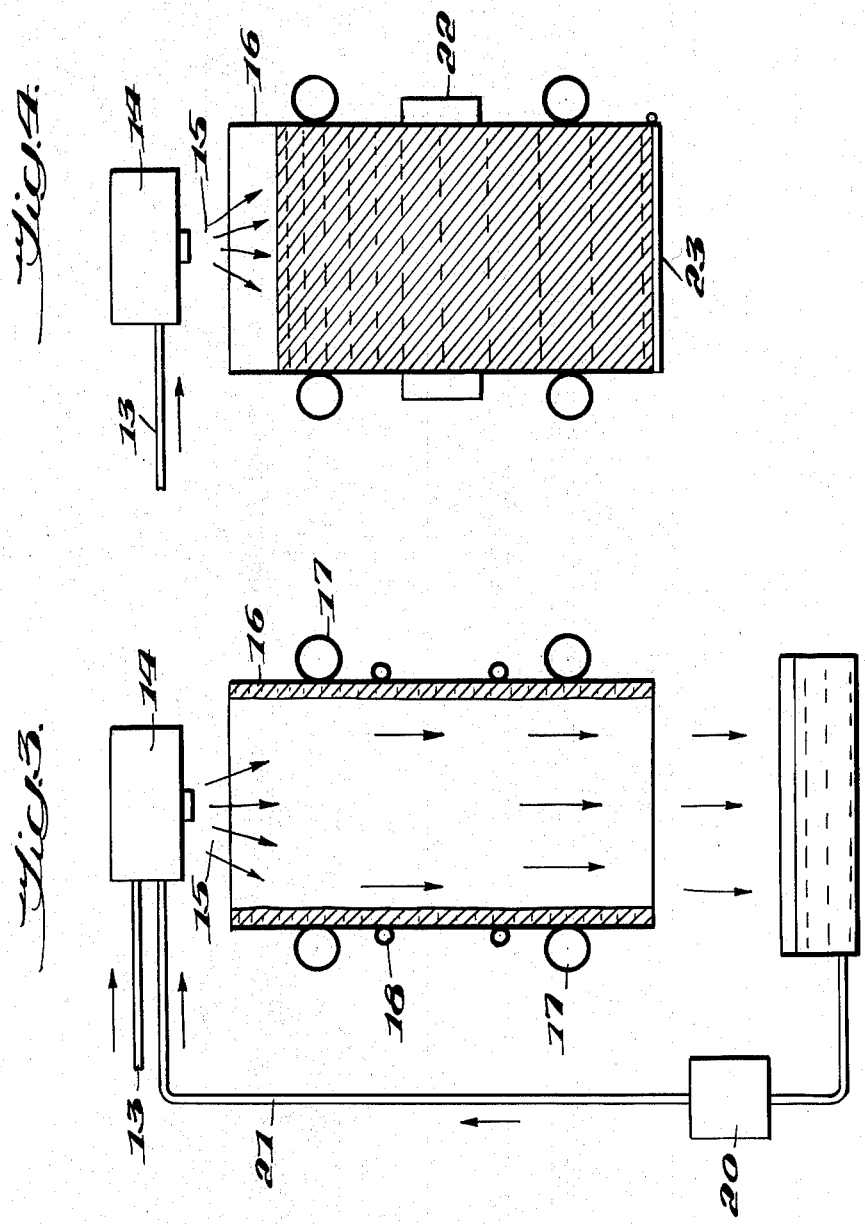

United States Patent Office 3,224,213
Patented Dec. 21, 1965

3,224,213
METHOD FOR MAKING AND HARVESTING
ICE USING ULTRASONIC VIBRATORS
Earl E. Hoyt, Jr., 421 West Ave., Northvale, N.J.
Filed July 17, 1964, Ser. No. 383,304
3 Claims. (Cl. 62—68)

The invention relates to making and harvesting ice. More particularly, it relates to improved methods and means for producing clear machine manufactured ice in cube or other forms and harvesting the same from the freezing forms or molds in which the frozen blocks are produced.

An object of the invention is to provide an improved method of ice making and harvesting generally employable with presently known refrigerating equipment and means for carrying out the method to effect higher efficiencies and increased capacities with automatic ice cube or other ice form machines by substantial elimination of heat cycle operations now used and required in harvesting frozen ice cubes and other ice forms from ice making equipment.

A further object of the invention is the production of more efficient ice cubes and ice forms to minimize ice regealing and regealing problems in ice storage bins.

Another and more specific object and function of the invention is that of maintaining cleanliness in refrigerated freezing forms or evaporator-freezer forms so as to minimize maintenance operations.

Other objects and advantages of the invention will become apparent from the detailed description thereof which follows.

Present ice making methods and evaporator-freezer means employed therein involve alternating cycles of operations in ice freezing and ice harvesting. Automatic machines usually have automatic control means adjustably timed to effect proper alternating ice freezing and ice harvesting cycles of operations. In the ice harvesting cycles, in methods now practiced, it is necessary to utilize heating means such as electric coils, hot water or gas, reverse cycle heat or other heat equivalents to free ice from forms or molds in which the water is frozen. This results in loss of freezing time and complicates equipment. What would otherwise result in increased capacity and higher machine efficiency from an increased number of ice making cycles of operations is lost, and the manufacturing cost is increased, by the periods of time and energy consumed in the heating ice harvesting cycles, in restoring evaporators and freezing forms to freezing conditions and in resumption of the ice making cycle. Moreover, the utilization of heat results in complicated equipment, substantial increase in expense and in wet ice cubes or blocks of ice contributing a serious ice storage bin problem by the wet ice regealing.

Production of very clear ice being an important factor in the ice industry, mechanical agitation of the water or flowing it over the refrigerated surface to separate air and gas therefrom is in common practice. The flow method is more generally preferred by the industry because mechanical agitation heretofore employed is complex and thereby expensive. In the flow method liquid to be frozen is run over the refrigerated surface or sprayed thereagainst with unfrozen excess runoff water going to a sump or reservoir from whence it requires pumping mechanism, control means therefor and adjective equipment to return the excess water to its reflow position.

In the practice of this invention it becomes possible to increase the ice making capacity of machines, automatic or otherwise, to result in higher efficiency and better economy; to produce dryer ice; and to provide greater cleanliness of equipment to reduce maintenance costs. Accomplishment of these improvements is brought about by eliminating the heat cycles of operations now employed in ice harvesting by a method and means employed in performance thereof, whereby liquid is frozen while being subjected to ultrasonic agitation to drive off air and gas therefrom, and freezer forms or molds and the like are subjected to ultrasonic high frequency vibrations transduced therein by suitably arranged transducers in combination therewith, the transducers being energized by an ultrasonic high frequency generator connected with the transducers. Sequential and periodic operations of the transducers and/or the generator are to be regulated as desired by suitable conventional control means, not shown, but in such arrangement and application as to provide desired sequential operations. For illustrating the method and means employed therewith, the invention is hereinafter described in connection with diagrammatic illustrated examples of uses in the accompanying drawing wherein:

FIG. 1 is a diagrammatic view partly in cross section showing an embodiment of the invention where freezing is accomplished within a refrigerated insulated cold chamber as, for example, in commercial or domestic refrigerators.

FIG. 2 is a diagrammatic view partly in section of an embodiment of the invention in a new structural combination of transducers, refrigerating evaporator means and ice cube freezer form or mold, the view also illustrating manner of ice harvesting as, for example, from an automatic inverted ice cube mold machine, or with inversion of the freezing combination of FIG. 1.

FIGS. 3 and 4 are diagrammatic comparative views, FIG. 3 illustrating a conventional flow method and equipment, and FIG. 4 illustrating in a view similar to FIG. 3 an embodiment of the invention productive of freezing result obtainable by the method and structural arrangement of FIG. 3, but with simplified equipment productive of an increased number of freezing operations for a given period of time and with dryer ice end result.

In the illustration of FIG. 1 where ice cube making is accomplished in a cold chamber, numeral 1 indicates a wall insulated cold chamber provided with an access door 2 and having a representative evaporator means 3 of a refrigerating system for normally maintaining the interior of the chamber at low freezing temperature. Upstanding supports 4 are adapted to support in the upper zone of the cabinet the combination of ice cube freezing form or tray 6 in fixed contact relation with transducers 7 connected by supply lead 7′ with an ultrasonic high frequency generator 8. Connections between the freezer form or tray and the transducers are such that ultrasonic vibrations are transduced into the freezer form or tray when the transducers are energized, this being in response to controls, not shown, so that in the freezing of a predetermined volume of liquid in the freezer form the transducers are energized during the freezing period. The ultrasonic agitation transduced in the freezer forms being transferred to the liquid drives off air and gas therefrom resulting in production of very clear ice cubes. When the cubes are solidly frozen, controls, not shown, cause the generator and transducers to cease operations. When frozen cubes are to be harvested, the freezer form may be inverted and the transducers may be energized momentarily with result that the ultrasonic vibrations transduced in the freezer form causes quick separation of the ice cubes from the form without substantial change in temperature of the form, and, this momentary transducer operation frees surfaces of the form or mold from any matter tending to cling thereto, thus maintaining the freezer form in condition of cleanliness. Separation of surfaces of the ice cubes and the form is accomplished very quickly and the cubes have no tendency to hang as is sometimes the case in heating cycle operations.

The ultrasonic vibrations transduced in the freezer form, causing the cubes to dislodge and fall into the storage bin, may produce a very small amount of heat but the dislodgement is so quickly accomplished and the time element is so short that this heat is negligible and causes but slight material change in the freezer form temperature so that the frozen cubes are harvested substantially dry. This means, as with other embodiments of the invention, a higher efficiency and almost immediate readiness of freezer means to resume ice making, resulting in better economy in relation to quantity of ice which can be produced in a given time period and relative to the amount of energy consumed. Moreover, a basically superior ice cube results for the dryer ice minimizes ice regealing in storage and is more efficient than a wet or preheated cube which has already lost some of the B.t.u. removal capacity originally manufactured into it.

In an embodiment of the invention as in FIG. 2, the structural combination is that of ultrasonic high frequency generator 8 connected by supply leads 7' with transducers 9 in a fixed combination with evaporator 10 of a refrigerating system and ice cube freezer form or mold 11. The freezer form in this instance is in inverted position such positioning being normal in automatic inverted mold ice cube machines. A bin or receptacle 12 is illustrative of a receiver of the cubes from the freezer form in the cube harvesting operation. The receiver of the cubes may be any form or conveyor means. When, in this simplified structural arrangement, ice cubes become frozen harvesting thereof substantially dry and without material change in the temperature of the mold is accomplished quickly by ultrasonic high frequency vibrations transduced in the mold body by the transducers energized by the ultrasonic high frequency generator. In the harvesting operation cubes separate quickly from the mold and the mold frees itself of any foreign matter so as to be immediately conditioned for another ice making cycle of operation. This eliminates loss of efficiency and the added cost factors normally involved with present practices wherein lost time and energy consuming wastage are encountered before another ice making cycle can start.

Advantages, simplification of equipment, improved machine capacity and higher economy of operations from an embodiment of the invention as illustrated in FIG. 4 become further apparent by contrasting this showing with that of a conventional flow method in the diagrammatic illustration of FIG. 3. Like reference numerals are used in FIGS. 3 and 4 indicating structural equivalencies in the separate structural arrangements in carrying out the respective methods. In each, liquid to be frozen is supplied by pipe 13 to a supply reservoir 14 wherein volume of the liquid may be automatically controlled by float valve means or other well known practices, not shown, and, from whence the liquid descends by spray means 15 to flow over the inner refrigerated surface of the cylindrical form structure 16 maintained at freezing temperatures by an evaporator such as coils 17 of a refrigerating system. While the structural arrangements are substantially the same at this point for each method the structural combination of FIG. 4 becomes simplified and that of FIG. 3 becomes complex.

In the old or present practiced flow method of FIG. 3 clarity of ice produced is dependent on flow of the liquid over the inner frozen surface to separate air and gas from the water. Excess or runoff water which does not become frozen falls to a collecting reservoir from where it must be returned to the upper reservoir for reflow. This requires provision of extra pumping mechanism 20, further piping 21 and expensive control equipment, not shown, for pump mechanism operation. When ice is frozen in the structural arrangement of FIG. 3, harvesting thereof from form 16 entails heating the structure to melt the jointure of ice with the form in separating the ice block from the form. Whatever may be the manner or form of heating employed, refrigeration must be stopped for a substantial period of time wherein the freezer form means must undergo substantial temperature to effect dislodgement of the ice block in its harvesting. Thereafter further loss of time and energy results in restoring freezing conditions in the form.

In the comparative embodiment of the invention in FIG. 4 clarity of the ice is produced not only by the phase of liquid flow but by ultrasonic agitation of the water to free it from air and gas. This ultrasonic agitation results from transducers 22 fixed to form 16 and energized by connections from an ultrasonic high frequency generator, not shown, but as illustrated in FIGS. 1 and 2. The freezer form 16 in FIG. 4 is provided with a bottom sealing pivoted closure so that any excess water which does not freeze in its flow over the inner refrigerated wall is trapped in the form where its freezing continues along with side wall freezing in full forming of the ice block in the form. Due to the ultrasonic high frequency agitation the block of ice produced is very clear and it can be harvested from the form substantially dry without resorting to the use of heating means such as the heating coils 18 in FIG. 3.

Harvesting the ice block from form 16 by the method and apparatus of the invention does not require a heating cycle wherein the form becomes heated to melt the ice block jointure with the form. Refrigeration and ultrasonic vibrations need be stopped only momentarily to free the ice block from the form. The pivoted closure 23 is swung on its pivot free of the body of ice and to free the lower end of form 16 for passage of the ice block therethrough. The transducers are then again momentarily energized to produce ultrasonic high frequency vibrations in the form with result that the surface seal between ice block and the form is quickly broken to allow discharge of the ice block from the form. There need be but momentary operation of the transducers to break the seal and this is accomplished without material change in the freezer form temperature so that the ice block is harvested substantially dry. After discharge of the ice the freezer form may be rendered clean by transducer energization which frees surfaces of the form of any foreign matter. This leaves the form clean for a continued ice making cycle of operation which can commence almost at once after the sealing closure 23 is swung into form sealing position and full refrigeration is restored. Harvesting delays thereby become minimized to allow more freezing cycles of operation of the machine for a given period of time.

Having described the invention in connection with diagrammatic illustrations uses and structural combinations of refrigerating evaporators, freezer forms and ultrasonic high frequency transducers, it will be obvious to those skilled in the art that practice of the invention results in simplification of ice making equipment, practical elimination of the heretofore necessary heating practices in ice harvesting and minimization of maintenance operations in maintaining cleanliness of freezer equipment.

Practice of the invention and its operational steps with existing ice making plant machines, in reality, amounts to economic simplification of the existing equipment by substitution of the economically operated freezer form-ultrasonic transducer combinations, ultrasonic high frequency generator operated, for the more complicated and costly to operate freezer form and heating arrangements in existing plants, this substitution, however, resulting in increased plant production and higher economy.

In the ice making industry, many different structural freezer forms and evaporator arrangements are now employed. The invention is not limited to specific diagrammatic illustrations herein for structural combinations of structurally different types of freezer forms and molds combined with ultrasonic high frequency transducers are contemplated within the true spirit and scope of the appended claims.

I claim:
1. In the art of making frozen bodies from liquid in refrigerated freezer forms, the steps of subjecting the liquid in the form to ultrasonic high frequency agitation to drive off air and gas therefrom to produce clear frozen bodies, and harvesting the frozen bodies from the forms by subjecting the forms directly to ultrasonic high frequency vibrations therein to separate the frozen bodies from the form in harvesting.

2. In the art of making frozen bodies from liquid in refrigerated freezer forms as defined in claim 1, the added step of cleaning the freezer forms after ice harvesting by subjecting the forms to continued ultrasonic vibrations therein to free the forms of any foreign matter clinging thereto.

3. In the art of harvesting frozen bodies from freezer forms in which the bodies are frozen and in cleaning the forms, the steps of subjecting the forms to ultrasonic vibrations therein at spaced outer portions thereof to break the frozen seal between the forms and frozen bodies in harvesting, and cleaning the surfaces of the form after said harvesting by subjecting the forms to ultrasonic vibrations therein.

References Cited by the Examiner

UNITED STATES PATENTS

| 1,943,466 | 1/1934 | West et al. | 62—66 |
| 2,550,534 | 4/1951 | Damond | 259—1 |
| 2,582,250 | 1/1952 | Hershberg et al. | 62—72 X |
| 2,595,968 | 5/1952 | McCoy | 62—68 |
| 2,814,575 | 11/1957 | Lange | 134—1 |
| 2,815,193 | 12/1957 | Brown | 165—84 X |

FOREIGN PATENTS

| 128,028 | 5/1960 | Russia. |

ROBERT A. O'LEARY, *Primary Examiner.*

W. E. WAYNER, *Assistant Examiner.*